UNITED STATES PATENT OFFICE.

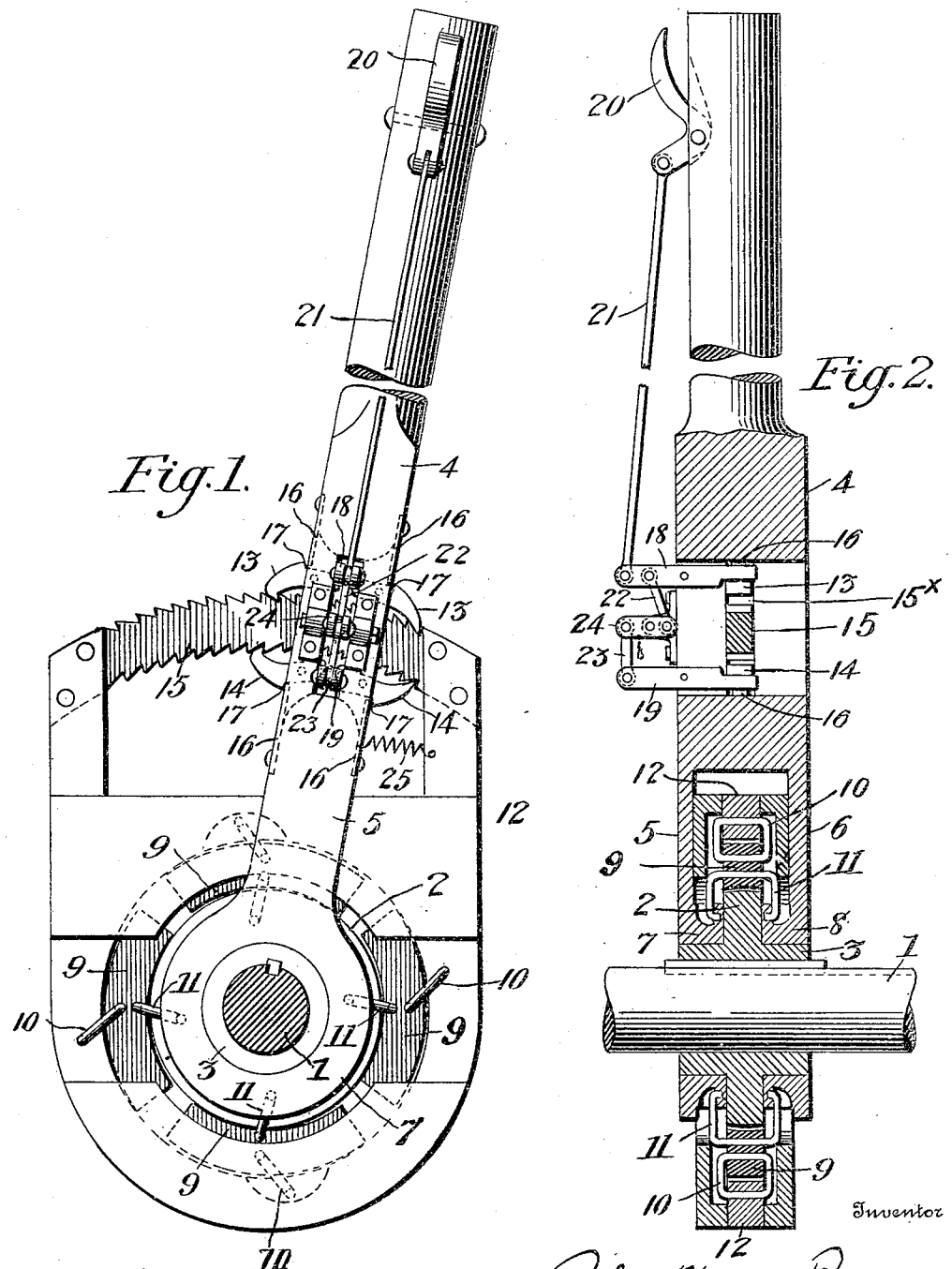

ROBERT HENRY BOWMAN, OF CANON CITY, COLORADO.

HAND-LEVER.

935,581.  Specification of Letters Patent.  Patented Sept. 28, 1909.

Original application filed February 21, 1907, Serial No. 358,541. Divided and this application filed May 14, 1907. Serial No. 373,613.

*To all whom it may concern:*

Be it known that I, ROBERT HENRY BOWMAN, a citizen of the United States, residing at Canon City, county of Fremont, and State of Colorado, have invented certain new and useful Improvements in Hand-Levers; and I do hereby declare the following to be a full, clear, and exact description of the invention, such as will enable others skilled in the art to which it appertains to make and use the same.

My invention relates to certain new and useful improvements in hand levers for use in connection with power transmitting mechanism and the like, such as described in my application filed February 21, 1907, Serial No. 358,541, for mechanical motor, of which the present application is a division.

The invention is illustrated in the accompanying drawings, in which—

Figure 1 is a side elevation of my improved lever mechanism as applied to a shaft brake of a power transmitting device, and Fig. 2 is a view partly in section and partly in elevation of the lever mechanism.

Corresponding and like parts are referred to in the following description and indicated in the two views of the drawing by the same reference characters.

Referring to the drawings, 1 indicates the shaft of the power transmitting device, on which shaft is mounted a brake wheel 2, the same being keyed thereon so as to revolve with said shaft as the same is rotated, said brake wheel being provided with a hub 3 which supports the hand lever 4, as clearly shown in the drawings. This hand lever is provided with a bifurcated lower end which straddles the brake wheel 2, the two arms 5 and 6 of said bifurcated end having perforated bosses 7 and 8, respectively, which surround the hub 3 of the brake wheel, and thus provide for the necessary support for the brake lever.

The brake wheel, heretofore referred to, is provided with a peripheral surface which is smooth and preferably rounded transversely, as shown, to afford a better gripping face for the brake shoes 9. These brake shoes 9 are correspondingly curved on their inner faces and are positioned about the brake wheel 2, in which position they are supported by means of links 10 and 11, said links 10 being connected to a frame work 12 bolted or otherwise secured to the machine frame of the power transmitting mechanism, and the links 11 being connected directly to the bosses 7 and 8 of the brake lever. The brake shoes are normally held away from the brake wheel, as clearly shown in Fig. 1 of the drawings, the brake lever at this time being in an extreme position to the right, and when said lever is thrown to the left, the links 10 and 11 will straighten out and the brake shoes will be moved into frictional contact with the brake wheel as will readily be understood, thereby braking the moving parts of the motor mechanism to which the brake is applied.

Suitably mounted on the brake lever 4 are the spring dogs 13 and 14 which are arranged for engagement with a curved ratchet bar 15, passing through a slot 15$^\times$ in the hand lever and supported on the upper end of the frame 12. Said rack has ratchet teeth on its upper and lower faces, the dogs 13 engaging the upper ratchet teeth, and the dogs 14 engaging the lower ratchet teeth. These dogs serve to hold the lever in the desired position, whereby a continued frictional contact may be had between the brake shoes and the brake wheel 2, without the necessity of the operator holding the brake lever. The dogs 13 and 14 are pivoted to the brake lever as shown and springs 16 are provided and are adapted to bear against the shoulder 17 formed on each dog for the purpose of permitting said dogs to, at all times, bear against the ratchet bar, unless lifted therefrom by the means to be described hereinafter. These pivoted dogs are so placed upon the upper and lower faces of the ratchet bar, that in all positions of the brake lever there will be at least one of the dogs in engagement with the ratchet teeth of said ratchet bar. Such a construction is found highly desirable for holding the brake shoes in frictional contact with the brake wheel, and is one which will continue to operate effectively even though the brake shoes wear considerably. Levers 18 and 19 are pivoted to the ratchet lever 4 and are adapted to bear against the inner or butt ends of said dogs 13 and 14, so that as the levers are operated they will serve to lift the tapered active ends of the dogs from engagement with the ratchet bar. It is to be noted that the lever 18 is so arranged as to bear against the inner ends of the two dogs 13, whereas the lever 19 engages the inner ends of the two dogs 14, and as the levers 18 and 19 are operated in opposite directions said dogs 13 and 14 will be lifted from the ratchet bar as heretofore described. A hand latch 20 is pivoted to the upper end of the ratchet lever and is connected to the outer end of the short lever 18 by means of a connecting rod 21, which, when the latch is operated by hand, serves to rock said levers 18 and 19 on their pivots and thus disengage the dogs from the ratchet bar for releasing the brake shoes. It is to be understood that by means of the links 22 and 23, and also the short lever 24, all of which are connected in a manner substantially as shown in the drawings, that the levers 18 and 19 will be rocked on their pivots in opposite directions, as will be necessary in the present arrangement of the dogs.

For the purpose of normally holding the brake lever in its extreme position to the right, in which position the brake shoes are held away from the brake wheel, there is provided a spring 25, one end of which is secured to the frame work 12, and the other end of which is fastened to the brake lever, as clearly shown in the drawings. It will be readily understood that in operating the brake lever to the left for applying the brake shoes, the pivoted dogs 13 and 14, heretofore referred to, will hold the brake lever in the desired position, and when said dogs are released the spring will serve to return said brake lever to its normal position.

What I claim is:

1. The combination of a hand lever, a ratchet bar having teeth at opposite edges, dogs mounted on said hand lever and coacting with the ratchet bar at its opposite edges or faces, said dogs being pivoted intermediate of their ends, levers or arms arranged to abut against the inner or butt ends of said pivoted dogs simultaneously and thereby raise their tapered active ends away from the ratchet bar, means to operate one of said levers or arms, and a connection between said levers or arms by which they are moved oppositely.

2. The combination with a hand lever, of a ratchet bar having ratchet teeth on its upper and lower faces, pivoted dogs mounted on said hand lever and adapted to engage the ratchet teeth on both faces of said bar for holding the lever in its located position, pivoted arms or levers coöperating with said dogs for lifting the same from the ratchet teeth, and a link connection between said arms or levers whereby, as one of the levers is operated in a certain direction, the other lever will be moved in an opposite direction.

3. The combination of a hand lever, a ratchet bar having teeth at opposite edges or faces, dogs on the hand lever pivoted intermediate of their ends and engaging the two series of teeth, transverse levers having free ends which simultaneously abut against said dogs at one end to depress the latter and move their opposite ends away from the ratchet bar, a link connection between said levers, and means to operate one of said levers.

4. The combination with a hand lever, of a ratchet bar having ratchet teeth on opposite faces thereof, pivoted dogs mounted on said lever for engaging the ratchet teeth on one of the faces of said ratchet bar, similar dogs for engaging the ratchet teeth on the other face of said ratchet bar, a pivoted arm or lever coöperating with each set of dogs for lifting the same from their respective ratchet teeth, connections between said arms or levers for moving them in opposite directions as one of said levers is operated, and a hand latch mounted on said hand lever and having connection with one of said arms or levers for operating the same, substantially as described.

5. The combination with a pivoted hand lever having a slot beyond its axis, of a frame or support in which said lever is positioned, a curved rack mounted on the upper end of the frame or support and extending through the slot in said lever, said rack having teeth on its upper and lower edges, upper and lower pairs of oppositely disposed pawls pivoted in said slot, upper and lower transverse levers pivoted between their ends and each having its inner end bearing against the ends of the pawls of the corresponding pair, a link connection between said levers by which they are moved oppositely, and an operating rod connected with one of said levers and having a hand piece mounted on the hand lever.

6. The combination of a hand lever, a ratchet bar having teeth on opposite faces, a plurality of dogs on the hand lever to engage each series of ratchet teeth, and means to actuate all of said dogs simultaneously.

7. The combination of a hand lever, a ratchet bar having teeth on opposite faces, a plurality of dogs on the hand lever to engage each series of ratchet teeth, and means to actuate all of said dogs simultaneously, said means including a single connecting rod extending alongside the hand lever.

8. The combination of a hand lever, a ratchet bar, a plurality of pivoted dogs on the hand lever at the same side of the ratchet bar and engaging the same series of teeth, a single lever which depresses the butt ends of said dogs simultaneously and thereby raises the dogs away from the ratchet bar, and means for operating said lever.

In testimony whereof I affix my signature, in presence of two witnesses.

ROBERT HENRY BOWMAN.

Witnesses:
 THEO. H. LOGAN,
 D. L. KAUFFMAN.